United States Patent [19]

Echols

[11] Patent Number: 4,629,481
[45] Date of Patent: Dec. 16, 1986

[54] LOW PRESSURE DROP MODULAR CENTRIFUGAL MOISTURE SEPARATOR

[75] Inventor: John D. Echols, Wilkinsburg, Pa.

[73] Assignee: Westinghouse Electric Corp., Pittsburgh, Pa.

[21] Appl. No.: 692,812

[22] Filed: Jan. 18, 1985

[51] Int. Cl.$^4$ .............................................. B01D 45/12
[52] U.S. Cl. ........................................ 55/348; 55/452; 55/457; 122/34; 122/488
[58] Field of Search ................. 55/203, 448, 449, 452, 55/456, 457, 348; 60/39.092; 122/34, 488, 492

[56] References Cited

U.S. PATENT DOCUMENTS

| | | | |
|---|---|---|---|
| 3,216,182 | 11/1965 | Cochran et al. | 55/336 |
| 3,329,130 | 7/1967 | Cochran | 122/34 |
| 3,360,909 | 1/1968 | Barnerias | 55/348 |
| 3,603,062 | 9/1971 | Robbins et al. | 55/348 |
| 3,735,569 | 5/1973 | Micheller et al. | 55/348 |
| 3,788,282 | 1/1974 | Modrak et al. | 122/34 |
| 3,887,342 | 6/1975 | Bunnelle | 55/203 |
| 3,961,923 | 6/1976 | Rouhani | 55/457 |
| 3,992,876 | 11/1976 | Agust | 60/39.092 |
| 4,162,150 | 7/1979 | Carson | 55/337 |
| 4,162,191 | 7/1979 | Cella | 122/34 X |
| 4,255,174 | 3/1981 | Simpson | 55/457 X |

Primary Examiner—Charles Hart
Attorney, Agent, or Firm—L. A. DePaul

[57] ABSTRACT

A modular separating unit for separating a liquid from a gas-liquid mixture, comprising an annular riser tube, a hub coaxial with and located within the riser tube, four curved blades mounted between the hub and the riser tube, an annular downcomer tube surrounding the riser tube, and an orifice ring having an outer diameter smaller than the inner diameter of the riser tube and located adjacent the outlet end of the riser tube. The leading edge and leading surface of each blade, which are disposed adjacent the inlet end of the riser tube, are contained in a plane parallel to the initial direction of flow of the gas-liquid mixture. The trailing edge and trailing surface of each blade are contained in a plane which is at an angle of approximately 37° to a plane perpendicular to the axis of the hub. The projections of the leading edge of one blade and the trailing edge of an adjacent blade onto a plane perpendicular to the axis of the hub form an angle of approximately 22.5°.

15 Claims, 4 Drawing Figures

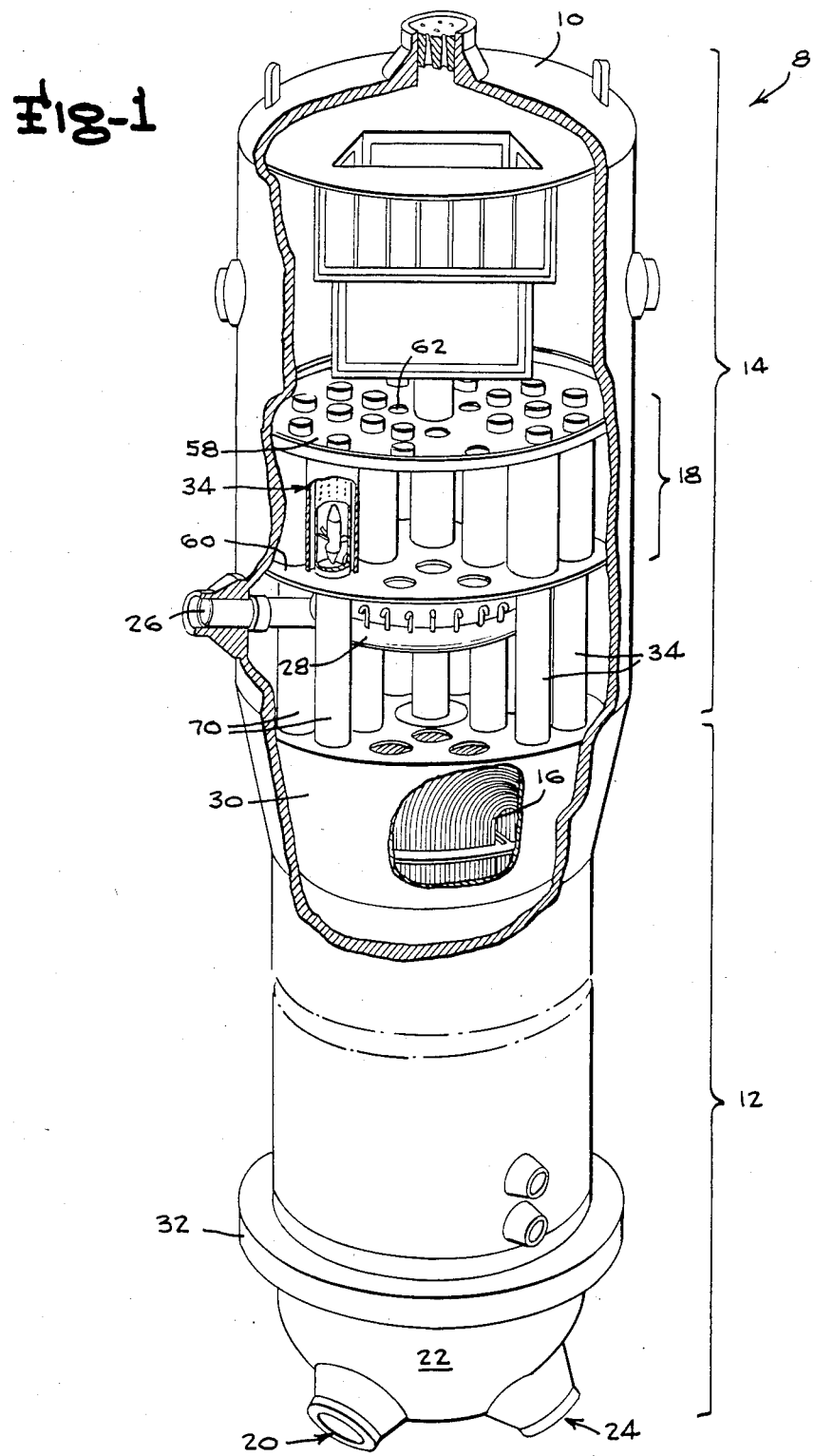

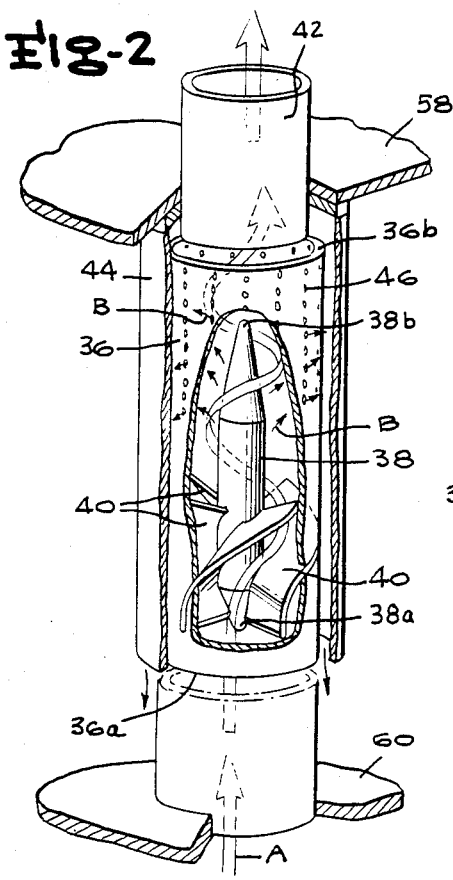
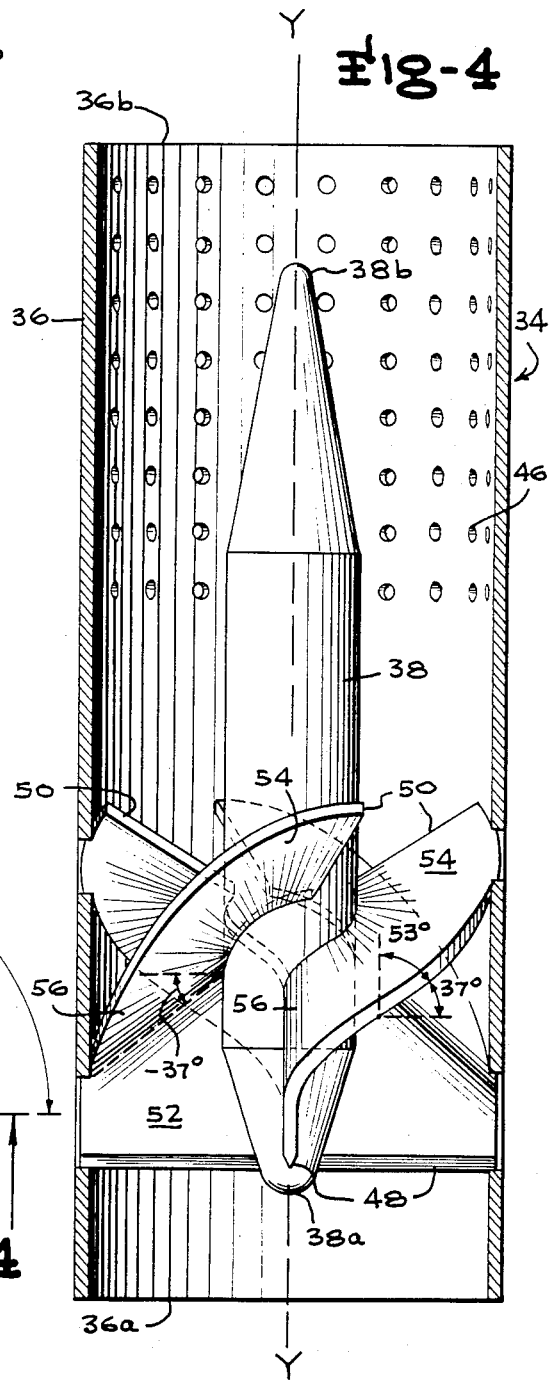
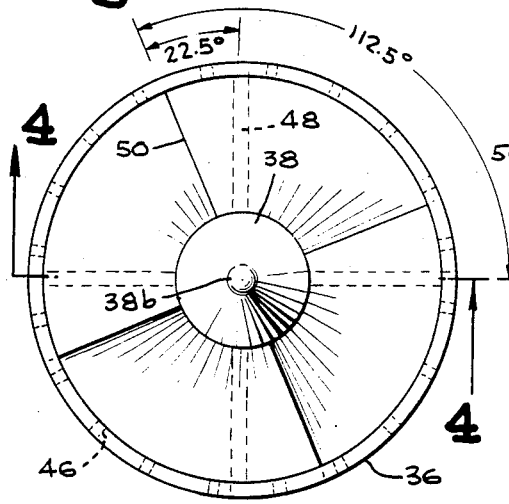

LOW PRESSURE DROP MODULAR CENTRIFUGAL MOISTURE SEPARATOR

BACKGROUND OF THE INVENTION

1. Field of the Invention

This invention relates to moisture separators for use in the pressure vessel of a recirculating steam generator, and more particularly, to a centrifugal separator which is modular in design and has a low pressure drop.

2. Description of the Prior Art

Pressurized water nuclear reactors utilize a closed-cycle-system design principle. This means that radioactive coolant in the reactor cycle is completely separated from the turbine-generator cycle. The high-temperature coolant water from the reactor, however, must create steam for the turbine-generator cycle. The link connecting the two cycles is the steam generator. In one common design, the steam generator consists of two integral sections, an evaporator section and a steam drum section. The evaporator section consists of a U-tube heat exchanger, while the steam drum section houses moisture-separating equipment.

Gas-liquid or steam-water separators adaptable for use in the pressure vessel of a boiling water nuclear reactor steam generator have been described by J. T. Cochran et. al. in U.S. Pat. No. 3,216,182, by J. T. Cochran in U.S. Pat. No. 3,329,130, by C. H. Robbins et. al. in U.S. Pat. No. 3,603,062, by T. M. Modrak et al. in U.S. Pat. No. 3,788,282, by R. H. Moen et. al. in U.S. Pat. No. 3,902,876 and by W. R. Carson in U.S. Pat. No. 4,162,150. In such arrangements, a plurality of closely spaced separator units are mounted on a dome or cover atop a steam chamber above the nuclear reactor core. These primary separator units incorporate spiral vanes to impart a spinning action to the steam-water mixture and can be used in conjunction with secondary separator units.

The fundamental objective of the primary separator units is to remove most of the moisture from the steam-water mixture which exits the tube bundle of the steam generator. Because of the complexities of the two phase flow phenomenon in a separator, analytical predictions of whether a new primary separator design can perform according to these specifications have proven to be highly uncertain. It is therefore desirable to test new designs prior to their installation in a nuclear reactor. For economic reasons, it is preferable to test new designs in a steam water test loop, and to test them at full-scale steam flow rates, entrance qualities, and pressures. However, available separator test loops impose an upper bound on the size of a separator which can be tested at full scale. Even a separator test loop of the highest steam flow capabilities is insufficient to test full scale primary separators of the size commonly in use with large steam generators.

This problem has been solved by employing small-scale modular separators, which can be clustered together for use in a steam generator. In the steam generator, the modules function substantially independently of each other, and their total effect is additive. Thus, a new design can be tested at full scale using a single module.

However, while a small scale (e.g., 7 inch) modular separator if fully testable, the use of a cluster of small scale risers in a steam generator results in a decrease in riser area when compared to existing larger separators. This decrease in riser area results in a significant increase in pressure drop in the two-phase portion of the circulation loop, and tends to reduce the stability of the steam generator.

Therefore, what is needed is a modular primary separator which is small enough to be fully testable at full scale, but which has a low pressure drop comparable to that of large primary separators.

SUMMARY OF THE INVENTION

In accordance with these and other objects of this invention, there is described apparatus for separating steam and water in a nuclear reactor steam generator. The separator apparatus of this invention comprises an annular riser tube having an inlet end and an outlet end, a hub coaxial with the riser tube, four blades evenly spaced around the axis of the hub and mounted between the hub and the inner wall of the riser tube, an orifice ring coaxial with and adjacent the outlet end of the riser, and an annular downcomer tube coaxial with and surrounding the riser tube. The riser tube is provided with parallel rows of spaced-apart holes adjacent its outlet end. Each blade has a leading edge and a trailing edge, a leading surface adjacent its leading edge, a trailing surface adjacent its trailing edge, and a transition surface intermediate its leading and trailing surfaces. The leading edge and leading surface of each blade are substantially adjacent the inlet end of the riser and are contained in a plane parallel to the flow direction of the gas-liquid mixture. The trailing edge and trailing surface are contained in a plane which is at an angle of approximately 37° to a plane perpendicular to the axis of the hub, while the projections of the leading and trailing edges of adjacent blades onto a plane perpendicular to the axis of the hub form an angle of approximately 22.5° between them. The transition surface is formed on an approximately 1 inch radius. The centerline of the transition surface radius is at an angle of approximately −37° to a plane perpendicular to the axis of the hub.

BRIEF DESCRIPTION OF THE DRAWINGS

While the specification concludes with claims particularily pointing out and distinctly claiming the subject matter of the invention, it is believed that the invention will be better understood from the following description taken in conjunction with the accompanying drawing, wherein:

FIG. 1 is a perspective, partially cut-away view of a nuclear reactor steam generator incorporating modular centifugal moisture separators in accordance with this invention;

FIG. 2 is a perspective, partially cut-away view of a modular centifugal moisture separator in accordance with this invention, particularily illustrating the manner in which the separator can be mounted in the steam generator, and the direction of steam and water flow;

FIG. 3 is a top perspective view of the separator illustrated in FIG. 2, particularily illustrating the positional relationship of the separator blades; and FIG. 4 is a cross-sectional view of the separator taken along line 4—4 of FIG. 3, particularily illustrating the details of the separator blades.

DESCRIPTION OF THE PREFERRED EMBODIMENTS

Referring now to the drawings, and in particular to FIG. 1, there is shown a nuclear reactor steam generator generally designated by the reference numeral 8.

It should be understood that with respect to the drawings that such directional designations as vertical, upper, lower, inlet, and outlet are made with reference to the direction of fluid flow, and are otherwise arbitrary.

Steam generator 8 has a vertical shell 10 and comprises an evaporator section 12 and a steam drum section 14. Evaporator section 12 houses a U-tube heat exchanger 16. Steam drum section 14 houses moisture separating equipment, including a primary separator assembly 18.

High-pressure, high-temperature reactor coolant flows into the inlet section 20 of the steam generator channel head 22, through the U-tubes 16, and back to the outlet section 24 of the channel head 22. Feedwater enters the unit through a nozzle 26 located in steam drum section 14, and is distributed by a feedwater ring 28 into a downcomer annulus formed by the tube bundle wrapper 30 and steam generator shell 10. The feedwater mixes with recirculation flow and enters tube bundle 16 near the tube sheet 32. Boiling occurs as the fluid rises in tube bundle 16, forming a steam-water mixture. Most of the entrained water from the steam is removed by primary separator assembly 18, which includes a cluster of modular centrifugal moisture separators 34.

Referring now to FIG. 2, each centrifugal moisture separator 34 comprises an annular riser tube 36 having an inlet end 36a and an outlet end 36b for containing steam-water mixture, a hub 38 having lower and upper ends 38a and 38b, a vertical axis Y (see FIG. 4) and coaxial with riser tube 36, four blades 40 mounted between the inner wall of riser tube 36 and hub 38 for imparting a helical flow to the steam-water mixture, an orifice ring 42 adjacent the outlet end of riser tube 36 and coaxial therewith for dispersing the water exiting outlet end 36b of riser tube 36, and an annular downcomer tube 44 surrounding riser tube 36 and coaxial therewith for transporting the water back to steam drum section 14. The inner diameter of downcomer tube 44 is greater than the outer diameter of riser tube 36, so that an annular pathway is formed between them. Riser tube 36 is formed with a plurality of parallel rows of holes 46 adjacent its outlet end 36b for dispersing water on its inner wall. Blades 40 are mounted between riser tube 36 and hub 38 below holes 46.

Referring now to FIG. 4, it can be seen that each separator 34 has four blades 40 which are spaced at equal intervals around axis Y of hub 38. Each blade 40 has a leading edge 48, a trailing edge 50, a leading surface 52 adjacent leading edge 48, a trailing surface 54 adjacent trailing edge 50, and a transition surface 56 intermediate leading surface 52 and trailing surface 54. Leading edge 48 and leading surface 52 are contained in a plane which is parallel to the flow direction of the steam-water mixture, designated by arrows A (see FIG. 2). Preferably, the edge of leading surface 52 adjacent hub 38 follows the contour of hub 38. Trailing edge 50 and trailing surface 54 are contained in a plane which is at an angle of approximately 37° to a plane perpendicular to the axis of hub 38. As shown in FIG. 3, the projections of a leading edge 48 of one blade and trailing edge 50 of an adjacent blade onto a plane perpendicular to the axis of hub 38 form an angle of approximately 22.5°. Transition surface 56 is formed on an approximately 1 inch radius. The centerline of the transition surface radius is at an angle of approximately −37° to a plane perpendicular to the axis of the hub.

Hub 38 has a cylindrical portion between its lower and upper ends 38a and 38b on which trailing surfaces 54 and transition surfaces 56 of blades 40 are mounted. Lower and upper ends 38a and 38b are substantially conical in shape, the tips of the cones being rounded. An annular opening is thereby formed between lower end 38a and the inner surface of riser tube 36 whose area decreases with distance from inlet end 36a of riser tube 36. Leading surfaces 52 of blades 40 are located in this annular opening.

Referring back to FIGS. 1 and 2, primary separators 34 are mounted in steam drum section 14 by welding to the tops of standpipes 70. Downcomer tubes 44 are connected to riser tubes 36 by three radial pins (not shown) spaced approximately 120° apart from each other. Orifice rings 42 are then welded to middle deck plate 58.

In operation, the steam-water mixture formed in evaporator section 12 rises vertically through standpipes 70 in fluid communication with the inlet ends 38a of riser tubes 36 into riser tubes 36, as shown by dotted arrows A. At this point the direction of flow of the steam-water mixture is linear. The velocity of the steam-water mixture increases as it passes through the annular opening between the inner surface of riser tube 36 and lower end 38a of hub 38. The leading surfaces 52 of blades 40, being parallel to the direction of flow, smoothly direct the steam-water mixture to the angled section of blades 40 (i.e., transition surfaces 56 and trailing surfaces 54), allowing a transition from vertical to helical flow. The parallel configuration of leading surfaces 52 is critical, because it prevents the abrupt introduction of the steam-water mixture into separators 34, thereby reducing the pressure loss. Once past leading surfaces 52, the steam-water mixture is forced into helical motion by trailing contours 54. It is desirable to make the diameter of riser tube 36 as small as possible because helical flow can be maintained for a longer distance in a tube of small diameter. The centrifugal force resulting from this helical motion forces the heavier portion of the steam-water mixture, the water, to be pushed out towards riser tube 36, as shown by solid arrows B in FIG. 2. This water forms a film on the inner surface of riser tube 36, which exits through holes 46 into the annular region between downcomer tube 44 and riser tube 36 for recirculation. The higher the point in riser tube 36, the greater the sum total of water removed. In order to force any remaining water into downcomer tube 44, the outer diameter of riser tube 36. The remaining water disperses around orifice ring 42 because the small diameter of orifice ring 42 does not provide a path for the water.

In a configuration built for testing in a singlephase water test loop and suitable for use in a Westinghouse APWR steam generator, riser tube 36 was made of 7.0 inch inside diameter, 7.25 inch outside diameter, 20 inch long tubing, and was perforated with 278 holes 46, which are 0.31 inches in diameter on 11/16 inch centers equally spaced at 18° arc increments (for a total porosity of 10%). Orifice ring 42 had a 5.75 inch inside diameter and 6.25 inch outside diameter. Downcomer tube 44 had a 9.5 inch inside diameter, a 10.9 inch outside diameter and a length of 10 inches. Hub 38 had a 2.38 inch maximum diameter and was 16.2 inches long. The tops of blades 40 were two diameters (14 inches) below the top of riser tube 36; blades 40 extended 6.06 inches, top to bottom. When the configuration was tested in the test loop, it showed a head loss coefficient of 3.9.

Another configuration was tested for comparison. The second configuration had the same hub dimensions, number of blades, and blade angle, but its blades were not contoured with their leading edges and leading surfaces parallel to the incoming flow. The head loss coefficient of the second configuration was 6.4. It can thus be seen that parallel-to-flow-direction leading blade surfaces are critical in the reduction of pressure drop.

As incorporated in moisture separating equipment 18 of a steam generator 8 as shown in FIG. 1, there are 150 7-inch separators 54 arranged in middle deck plate 58 on a 10.25 inch square pitch. In addition, a plurality of interstitial holes 62 are located among separators 34 in middle deck plate 58. Half of these holes serve as deck plate drains, and are fitted with pipes (not shown) which extend below the water level of steam generator 8. The remainder of holes 62 are steam vents which are fitted with collars 60 to inhibit the re-entrainment of any liquids standing on the deck plate.

Thus, it will be seen that the present invention provides improved apparatus for removing liquid from a gas-liquid mixture. While a preferred embodiment of the invention has been disclosed, it should be understood that the spirit and scope of the invention is to be limited solely by the appended claims, since numerous modifications of the disclosed embodiments will undoubtedly occur to those of skill in the art.

I claim:

1. A modular separating unit for separating a liquid from a gas-liquid mixture, comprising:
   an annular riser tube having an inlet end and an outlet end, said riser tube being perforated by parallel rows of spaced-apart holes adjacent said outlet end;
   a hub having upper and lower ends, an axis, and a cylindrical portion between said upper and lower ends coaxial with said riser tube and located therewithin;
   a plurality of blades mounted between said cylindrical portion of said hub and said riser tube below the holes in said riser tube, said blades being spaced at substantially equal intervals about the axis of said hub, each of said blades having a leading edge and a trailing edge, a leading surface adjacent said leading edge, a trailing surface adjacent said trailing edge, and a transition surface intermediate said leading and trailing edge surfaces, said leading edge and said leading surface being disposed substantially adjacent said inlet end of said riser tube and contained in a plane parallel to the flow direction of the gas-liquid mixture, said trailing edge and said trailing surface being contained in a plane which is at an angle of approximately 37° to a plane perpendicular to the axis of said hub, the projections of said leading edge of one of said blades and said trailing edge of an adjacent one of said blades onto a plane perpendicular to the axis of said hub forming an angle of approximately 22.5° therebetween;
   an orifice ring coaxial with and adjacent to said outlet end of said riser tube, the outer diameter of said orifice ring being smaller than the inner diameter of said riser tube; and
   an annular downcomer tube coaxial with and surrounding said riser tube, the inner diameter of said downcomer tube being greater than the outer diameter of said riser tube.

2. The modular separating unit of claim 1, wherein the inner diameter of said riser tube is approximately 7 inches.

3. The modular separating unit of claim 1, further comprising means adjacent said inlet end of said riser tube for increasing the velocity of the steam-water mixture.

4. The modular separating unit of claim 3, wherein at least a portion of said leading edges of said blades is located in the area of increasing velocity.

5. The modular separating unit of claim 4, said lower end of said hub being substantially conical in shape, and said velocity-increasing means comprising said lower hub.

6. The modular separating unit of claim 1, wherein the number of blades is four.

7. A modular separating unit for separating a liquid from a gas-liquid mixture having an initial linear direction of flow, comprising:
   at least two means for imparting a helical flow to the gas-liquid mixture, whereby the liquid is separated from the gas, said first and second imparting means being arranged at substantially equal intervals about an axis parallel to the initial direction of the flow of the mixture, each of said imparting means having a trailing surface contained in a plane which is at an angle of approximately 37° to said axis for imparting a helical flow to the mixture, a trailing edge adjacent said trailing surface a leading surface parallel to said axis, a leading edge adjacent said leading surface, and a transition surface intermediate said leading and trailing surfaces, the projections of said leading edge of one of said imparting means and said trailing edge of an adjacent one of said imparting means onto a plane perpendicular to said axis forming an angle of approximately 22.5° therebetween whereby the linear direction of flow is smoothly transformed to a helical direction of flow, and the liquid is separated from the gas;
   means surrounding said imparting means for containing the gas-liquid mixture at said imparting means and maintaining the helical flow of the gas-liquid mixture above said imparting means;
   means forming a pathway around said containing means for transporting the liquid out of said separating unit; and
   means associated with said containing means for transferring the liquid into said pathway-forming means.

8. The modular separating unit of claim 7, said transferring means being located in said containing means.

9. The modular separating unrt of claim 7, said transferring means being located in said containing means, said transferring means comprising:
   means located in said containing means for placing the interior of said containing means in fluid communication with said pathway-forming means; and
   means located external to said containing means and adjacent said outlet end thereof for dispersing the liquid into said pathway-forming means and transporting the gas out of the unit.

10. The modular separating unit of claim 7, wherein the number of said imparting means is four.

11. A separating unit for separating a liquid from a gas-liquid mixture, comprising:
   (a) a housing through which a flow of the gas-liquid mixture is directed and comprising an inlet end and an outlet end, said housing being perforated by spaced-apart holes adjacent said outlet end;

(b) a hub having an axis, and leading and trailing ends disposed substantially parallel to said flow of the gas-liquid mixture, said hub disposed coaxially within said housing;

(c) a plurality of blades mounted between said hub and said housing in front of said holes, said blades being spaced at substantially equal intervals about said axis of said hub, each of said blades having a leading edge and a trailing edge, a leading surface adjacent said leading edge, and a trailing surface adjacent said trailing edge, said leading edge and said leading surface being disposed substantially adjacent said inlet end of said housing and contained substantially in a first plane, said first plane oriented substantially parallel to said flow of the gas-liquid mixture, said trailing edge and said trailing surface being contained in a second plane, said first plane intersecting said second plane to define an intersection line, said intersection line disposed at an angle with respect to an imaginery plane disposed perpendicular to said axis, said angle being approximately 37° to maximize the swirl imparted to said flow of the gas-liquid, while at the same time minimizing the pressure drop established by said flow of the gas-liquid mixture over said plurality of blades.

12. The separating unit as claimed in claim 11, wherein adjacent blades of said plurality over lie each other.

13. The separating unit as claimed in claim 12, wherein the projections of said leading edge of one of said blades and said trailing edge of an adjacent one of said blades onto said imaginery plane from therebetween optimality an angle of approximately 22.5°.

14. The separating unit as claimed in claim 11, wherein each of said leading edges is disposed substantially perpendicular to said axis.

15. The separating unite as claimed in claim 11, wherein the number of said plurality of blades is four, and the projections of said leading and trailing edges of one of said blades onto said imaginery plane form therebetween an angle of approximately 112.5°, the projections of said leading edge of one of said blades and said trailing edge of an adjacent one of said blades onto said imaginery plane form therebetween an angle of approximately 22.5°.

* * * * *